United States Patent [19]

Bressler et al.

[11] Patent Number: 4,856,811
[45] Date of Patent: Aug. 15, 1989

[54] DEVICE FOR TRANSPORTING SKI EQUIPMENT

[75] Inventors: Peter W. Bressler, Philadelphia, Pa.; Peter D. Byar, Willingboro, N.J.; Benjamin J. Beck; G. Gordon Fluke, Jr., both of Philadelphia, Pa.; Brad Magill, Wayne, Pa.; Gary Winig, Lafayette Hills, Pa.; Tracy H. Magill, Wayne, Pa.

[73] Assignee: Magwin Enterprises, Inc., Philadelphia, Pa.

[21] Appl. No.: 25,241

[22] Filed: Mar. 12, 1987

[51] Int. Cl.⁴ ............................................. A63C 11/02
[52] U.S. Cl. ................................ 280/652; 224/917; 280/655; 280/814; 280/47.131; 294/147
[58] Field of Search ............ 280/645, 652, 654, 655, 280/659, 47.13 R, 47.24, 47.3, 814, 47.19, 815; 224/917; 211/70.5; 294/147

[56] References Cited

U.S. PATENT DOCUMENTS

| | | | |
|---|---|---|---|
| 1,016,381 | 2/1912 | Watson | 280/47.13 R |
| 1,225,444 | 5/1917 | Leclair | 280/8 |
| 1,486,655 | 3/1924 | Gourley | 280/DIG. 6 |
| 2,438,078 | 3/1948 | Sutphen | 280/DIG. 6 |
| 2,480,597 | 8/1949 | Nelson | 280/DIG. 6 |
| 2,514,849 | 7/1950 | Dewing | 280/659 |
| 2,518,803 | 8/1950 | Marvin | 280/DIG. 6 |
| 2,701,725 | 2/1955 | Meiklejohn | 280/DIG. 6 |
| 2,782,973 | 2/1957 | Lang | 211/70.1 |
| 2,999,378 | 9/1961 | Blair | 211/70.1 |
| 3,046,031 | 7/1962 | Reynolds | 280/8 |
| 3,413,012 | 11/1968 | Coffman | 280/DIG. 6 |
| 3,504,921 | 4/1970 | Osmond | 280/8 |
| 3,756,420 | 9/1973 | Brown | 280/814 |
| 3,794,226 | 2/1974 | Penniman | 224/5 R |
| 3,909,031 | 9/1975 | Schmaedeke et al. | 280/814 |
| 3,934,895 | 1/1976 | Fox | 280/47.26 |
| 4,084,735 | 4/1978 | Kappas | 211/70.1 |
| 4,114,915 | 9/1978 | Lello et al. | 280/47.19 |
| 4,126,255 | 11/1978 | Olson | 280/814 |
| 4,131,289 | 12/1978 | Maller | 280/814 |
| 4,268,050 | 5/1981 | Kennedy, Sr. | 224/917 |
| 4,358,137 | 11/1982 | Gramm | 280/814 |
| 4,401,319 | 8/1983 | Kazmark | 280/655 |
| 4,460,188 | 7/1984 | Maloof | 280/645 |
| 4,666,184 | 5/1987 | Garvey | 280/814 |

FOREIGN PATENT DOCUMENTS

| | | | |
|---|---|---|---|
| 1299186 | 6/1962 | France | 280/814 |
| 1552202 | 1/1969 | France | 280/47.13 R |
| 2563112 | 10/1985 | France | 280/814 |
| 308215 | 6/1955 | Switzerland | 224/917 |
| 418201 | 2/1967 | Switzerland | . |
| 451775 | 5/1968 | Switzerland | 280/814 |
| 1025705 | 4/1966 | United Kingdom | 280/DIG. 6 |

Primary Examiner—David M. Mitchell
Attorney, Agent, or Firm—Panitch, Schwarze, Jacobs and Nadel

[57] ABSTRACT

A device for transporting ski equipment includes a frame adapted for collapsed and extended orientations and having an elongated direction in the extended orientation includes first and second frame members collapsably coupled together for providing the collapsed and extended orientations of the frame. A first bracket is provided on the first frame member extending transversely to an elongated direction of the frame in the extended orientation and is adapted for receiving ends of a pair of skis. A second bracket is provided on the second frame member extending transversely to the elongated direction and has an open side for receiving the pair of skis received in the first bracket. A latch is positionable across the open side of the second bracket for closing the bracket and securing the pair of skis received in both the first and second brackets to the frame. Wheels are provided at one end for rolling the device over a surface. The device is further adapted for receiving and securing a pair of ski poles to the frame and supporting a pair of ski boots side by side on either side of the skis.

21 Claims, 7 Drawing Sheets

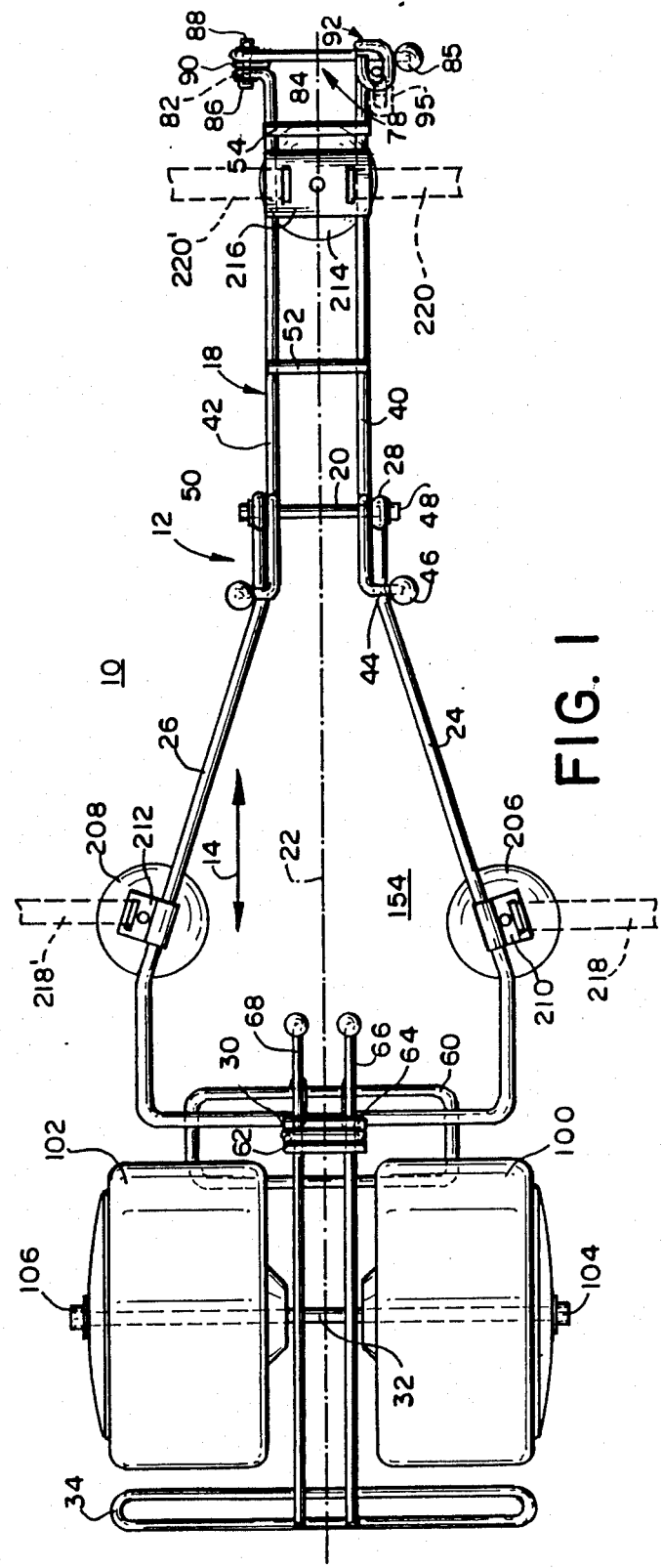

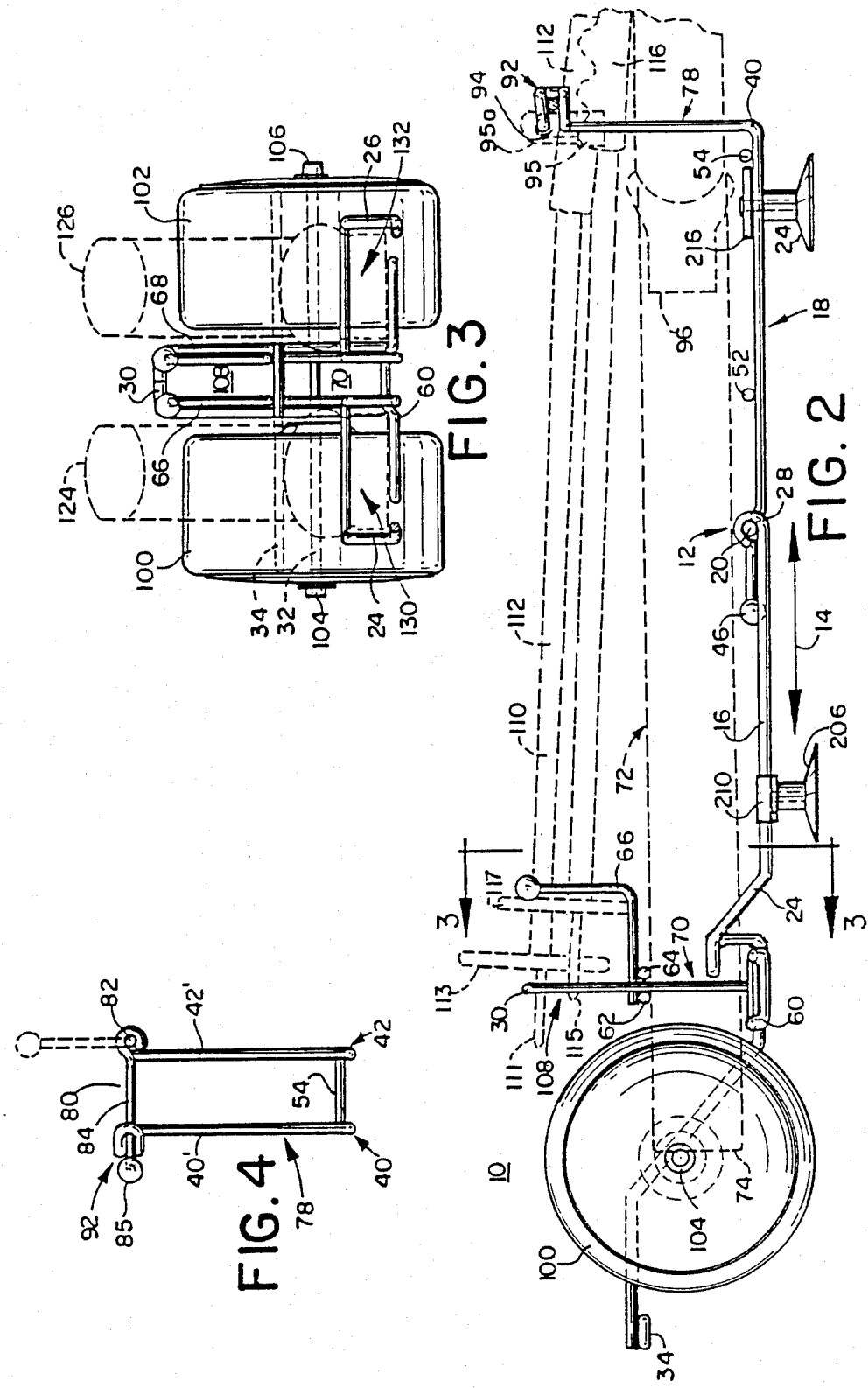

DEVICE FOR TRANSPORTING SKI EQUIPMENT

FIELD OF THE INVENTION

The invention relates to ski equipment transporting devices and, in particular, to a device for easy movement of the skis, ski boots and poles of a single skier on a vehicle and along the ground.

BACKGROUND OF THE INVENTION

A wide variety of vehicle mountable devices for transporting ski equipment have been and are commercially available. A major sub-class of these devices are intended solely for transporting ski equipment on the vehicle. To transport ski equipment away from the vehicle, the user must wear the equipment or carry it by hand.

Another sub-class of ski equipment transporting devices are designed to transport equipment on a vehicle and then to be removed from the vehicle for transporting the equipment by hand away from the vehicle. This invention relates to the latter type of device.

Ski equipment transporting devices of the latter type generally are designed to carry several sets of skis or several sets of skis and boots. Such devices are larger, bulky and heavier than is desired for easy mounting and removal of the device from the vehicle and for negotiating the device along the ground.

Devices of the latter type generally also employ a pair of wheels and one or more additional skid surfaces so that the device also may be negotiated over yielding surfaces, such as soft, unpacked snow. However, such designs add to the bulk, complexity and cost of construction of these devices.

In view of these considerations it would be very desirable to provide a ski equipment transporting device which is both vehicle mountable and easily handled over both firm and soft surfaces, and further is modular in that it is designed to carry all the necessary equipment of one skier. Such a device can be sized to be conveniently handled by a single person. It further is desirable that such a device be easily lockable so all or essentially all of the equipment carried on the device can be locked to the device.

SUMMARY OF THE INVENTION

With the foregoing in mind, the invention is a device for transporting ski equipment which comprises frame means adapted for collapsed and extended orientations and having an elongated direction in the extended orientation for receiving and supporting a pair of skis and including first and second frame members collapsably coupled together for providing said collapsed and extended orientations. The device further comprises first bracket means on the first frame member, extending transversely to the elongated direction and adapted for receiving ends of a pair of skis and second bracket means on the second frame member extending transversely to the elongated direction and having an open side for receiving the pair of skis received in the first bracket means. The device further comprises latching means positionable across said open side of the second bracket means for closing said open side and securing the pair of skis received in both the first and second bracket means to the frame means.

A BRIEF DESCRIPTION OF THE DRAWINGS

The foregoing summary, as well as the following detailed description, will be better understood when read in conjunction with the appended diagrammatic drawings. For the purpose of illustrating the invention, there is shown in the appended drawings, embodiments which are presently preferred. It is understood, however, that the invention is not limited to the precise arrangements and originality shown. In the drawings:

FIG. 1 is a plan view a preferred embodiment of the device.

FIG. 2 is a side elevation of the preferred device indicating in phantom ski poles and skis secured to the device.

FIG. 3 is a localized section view of the preferred device along lines 3—3 of FIG. 2.

FIG. 4 is a slightly enlarged local view of the right end of the preferred device in FIG. 2.

DETAILED DESCRIPTION OF THE INVENTION

Figure 6:
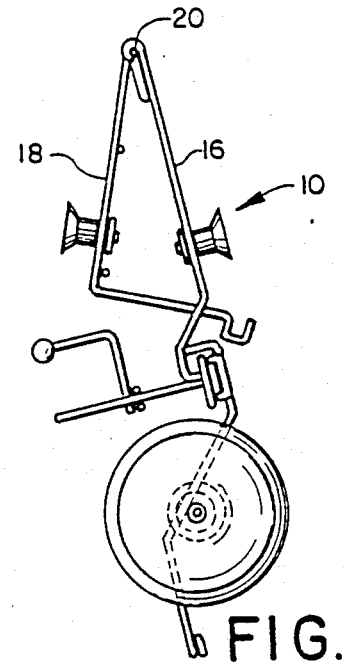
FIG. 6 is a simplified side view of the preferred device in a collapsed orientation.

Referring to FIGS. 1 and 2, the invention, a device for transporting ski equipment, is indicated generally at 10 and includes a frame means 12 having an elongated direction indicated by arrowed line 14 in both figures. Frame means 12 includes a first frame member 16 and a second frame member 18. The pair of frame members 16 and 18 are collapsably coupled together at their adjoining ends by means of a transverse axle member 20 (FIG. 1) for providing the extended orientation of the device 10 and frame means 12, shown in FIGS. 1 and 2, and a collapsed orientation to be described with respect to FIG. 6.

Except for a latching mechanism at the right end, (to be later described) the device 10 is symmetric with respect to a central plane 22, parallel to the elongated direction 14 and seen on edge in FIG. 1. Still referring to FIG. 1, the major components of the first frame member 16 are a plurality of bent wires. The primary pair of bent wires 24 and 26 are symmetric with respect to the plane 22. One end 28 of the bent wire 24 is bent loosely in almost a complete circle around the transverse axle member 20 so as to be rotatable around that member 20 (see FIG. 2). The bent wire 24 is further spot welded to the one vertical side and the bottom side of a rectangular member 30, also formed from a piece of bent wire, welded to a second transverse axle member 32 and two transversely extending, parallel sides of a generally ovaloid stand 34, again formed by a piece of suitably bent wire, at the left end of the device. Bent wire 26 is symmetric to bent wire 24 with respect to the central plane 22. The various bends of the 24 and 26 in the vicinity of the generally rectangular member 30 can also be seen in FIGS. 2 and 3.

Referring again to FIG. 1, the major elements of the second frame member 18 are also formed by a plurality of bent wires. The two major wires 40 and 42, are generally symmetric to one another with respect to the central plane 22, except at the extreme ends of the wires 40, 42 distal to the transverse axle member 20. Wire 40 is bent partially around and welded to the transverse axle member 20 so as to be fixedly coupled with that member. The extreme end 44 of the bent wire 40, proximal the transverse axle member 20, is bent generally perpendicularly outward from the central plane 22 so as to overlap a portion of the bent wire 24. This overlap stops relative rotation of the first and second frame members 16 and 18 when they are approximately 180 degrees apart to prevent the members 16 and 18 from being rotated beyond the extended orientation of the device 10 and frame means 12 depicted in FIGS. 1 and 2. A plastic ball 46 is press fitted to the extreme tip of the bent wire 40 for safety and aesthetics. Bent wire 42 is of a similar configuration. The bent end 28 of wire 24 and a similar bent end of wire 26 are prevented from coming off the transverse axle member 20 by conventional press fit metal caps 48 and 50 mounted on either end of the transverse axle member 20. (Cap 48 is omitted from FIG. 2 for clarity). The two bent wires 40 and 42 of the second frame member 18 are further coupled by two additional wires 52 and 54 extending transversely to the central plane 22 and spot welded to each of the wires 40 and 42. End portions of the wire elements 40 and 42, distal to the transverse axle member 20, are bent transversely generally perpendicularly to the elongated direction 14 but parallel to the plane of symmetry 22 to form a lockable bracket to be later described.

As is best seen in FIGS. 2 and 3, a second generally rectangular member 60, also formed by a suitable bent wire having ends which are welded together, is draped generally horizontally over and spot welded to each of the wires 24 and 26 at two points where the rectangular member 60 contacts each of those wires. Another pair of wires 62 and 64 are spot welded in a transversely direction to the central plane 22 to either upstanding side of the rectangular member 30. The elements 62 and 64 support a pair of right angle bent wires 66 and 68 which are also spot welded. As is best seen in FIG. 3, wire 64 (and opposing wire 62) effectively divide the rectangular member 60 in half. The wires 62 and 64 define, with the lower half of the rectangular member 60, a first bracket means 70 extending transversely to the elongated direction 14 and having a closed circumference formed by the lower portion of rectangular member 60 and the wires 62 and 64 which is adapted for receiving ends of a pair of skis. In particular, the first bracket means has a central opening which is sized to receive the ends (i.e. tails) 74 of one pair of skis 72, indicated in phantom in FIG. 2. The tails 74 of the pair of skis can be extended through the first bracket means 70 until they contact the second transverse axle member 32 as indicated in FIG. 2. The closed sides of the first bracket means, provided by the lower half of rectangular member 30 and wires 62 and 64 prevent movement in any direction transverse to the elongated direction 14 of the pair of skis 72 received in the first bracket means 70.

As is best seen in FIG. 4, the transversely turned end portions 40' and 42' of wires 40 and 42 of the second frame means 18 form, with transverse wire 54, a second bracket means 78 on the second frame member 18 extending transversely to the elongated direction 14 and having an open side 80 for receiving the pair of skis 72 received in the first bracket means 78. The extreme distal end of the wire 42 is bent substantially in a circle to receive a short wire 82 (indicated in section) which rotatably supports a latch 84 also formed by a length of wire which is bent at one end around and is rotatably supported on the short wire 82 and has a press fit plastic cap 85 on its other end. Referring to FIG. 1, a pair of press fit caps 86 and 88 hold the extreme distal end of wire 42 and the bent end of the latch 84 to the short wire 82. If desired, a washer 90 can be positioned between the bent wire 40 and latch 84. As is best seen by comparing FIGS. 1, 2 and 4, the extreme end of the bent wire 40 distal to the transverse axle member 20 is bent in a convoluted manner to form a U shape bracket 92 having an open side 94 (see FIG. 2) for receiving and releasing the latch 84. The bracket 92 has openings on either side of the latch 84 to provide a single attachment point for receiving the shackle 95a of a padlock 95 (indicated in phantom in FIG. 2) or other lock for locking the skis to the frame means 12. The latch 84 and U-shaped bracket 92 constitute latching means for securing the open side 80 of the second bracket means 78. The latch 84 of the latching means is positionable across the open side 80 of the second bracket means 78 for closing said open side 80, and securing the pair of skis 72 received in both the first bracket means 70 and second bracket means 78 to the frame means 12. The "open" orientation of the latch 84 opening side 80 is indicated in phantom.

The second bracket means 78 is spaced approximately 21 inches from the second transverse axle member 32 so that when the pair of skis 72 is inserted through the first bracket means 70 until contacting the second transverse axle member 32, the second bracket means 78 will extend at least beyond the heel portion 96 of the bindings on the skis 72 (indicated in phantom in FIG. 2) so that the bindings 96 will prevent removal of the skis in the elongated direction out of the first and second bracket means 70 and 78, respectively.

As is best seen in FIGS. 1 and 3, wheel means in the form of a pair of wheels 100 and 102 are coupled with the frame means 12 by being rotatably supported on the second transverse axle member 32 spot welded with the bent wires 24 and 26. The wheels are provided for rolling the device 10 across a surface. Again, press fit caps 104, 106 are used to retain the wheels 100 and 102 to the second transverse axle member 32. An important aspect of the invention is that the wheels 100, 102, are relatively oversized compared with the wheels used by prior transporting devices for ski equipment, so as to provide an enlarged support area to enable the device 10 to be rolled or, if necessary, dragged over a soft, yielding surface such as unpacked snow. The use of oversized wheels eliminates the necessity of auxiliary skis or an auxiliary skid surface employed by earlier devices with narrower wheels to prevent those devices from sinking into the snow. In the preferred embodiment, the wheels are suggestedly about eight inches or more in diameter and four inches or more in axial width.

Referring to FIG. 2, third bracket means 108 for receiving the tips 111, 115, respectively of each of one of a pair of ski poles 110, 114 (indicated in phantom) is supported by the first bracket means 70 extending transversely to the elongated direction 14 from the frame means 12. The third bracket means 108 is formed by the upper half of rectangular member 30 and transverse wires 62 and 64. The second bracket means 78 is further adapted by being made sufficiently high to also receive the handles 112 and 116 of the pair of ski poles 110, 114 received in the third bracket means 108. The third bracket means 108 is positioned with respect to the second bracket means 78. in particular spaced apart about 20 inches in the elongated direction 14, for receiving and securing to the frame means 12 the pair of ski poles 110, 114 received in the second bracket means 78 with the pair of skis 72. The right angle bent wires 66 and 68 are spot welded to wires 62 and 64 and are positioned for capturing the baskets 113 and 117 of the poles 110 and 114, respectively, with the upper half of rectangular element 60 to prevent the poles 110, 114 from being withdrawn from the third bracket means 108 in the elongated direction 14. The poles must be rotated out of the second bracket to be removed from the third bracket means. In this way, the poles can be locked with the skis to frame means 12. One of ordinary skill in the art will appreciate that while the transverse wires 62 and 64 provides the desired function of further strengthening the rectangular member 30, supporting the right angle bent wide elements 66 and 68 and dividing the rectangular element 30 into two halves, they could be eliminated from the embodiment if desired, so that the rectangular element 30 forms one continuous, closed-sided bracket means for receiving both the pair of skis 72 and poles 110, 114.

The first frame member 16 is further adapted for receiving and supporting a pair of ski boots side by side, each ski boot on an opposing side of the pair of skis 72 received in the first and second bracket means 70 and 78 respectively. The pair of ski boots 124, 126 is indicated in phantom in FIG. 3. As is best seen in FIG. 1, the adjoining portions of the first and second frame members 16 and 18 form a substantially planar platform for receiving and supporting the ski boots 124 and 126. The platform is substantially parallel to the elongated direction 14 and perpendicular to the central plane 22. As is best seen in FIGS. 2 and 3, portions of the wires 24 and 26 are bent in the vicinity of the rectangular members 30 and 60 to form a pair of generally rectangular slot 130 and 132 respectively (FIG. 3) The side of the rectangular member 60 most proximal the transverse axle member 20 substantially closes the bottom of each of the generally rectangular slots 130, 132, to receive and support the heel portion of the ski boots 124 and 126 respectively.

Figure 5:
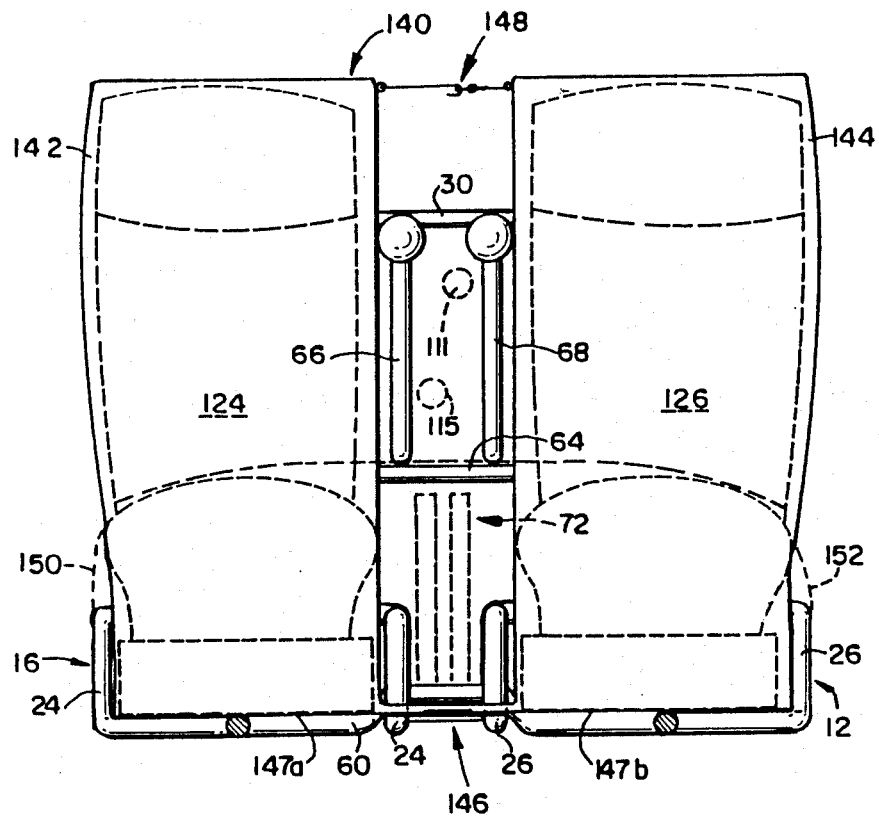
FIG. 5 is a localized section view of the device along lines 3—3 depicting a boot bag used with the preferred device.

The boots 124 and 126 can be secured in varying ways to the frame means 12 as is shown in FIG. 5. An approach preferred for protecting the boots is the combination of the device 10 with a boot bag means in the form of a generally U-shaped saddle bag 140 having a pair of hollow, upstanding side members 142 and 144 which is provided for receiving, enclosing and protecting the pair of ski boots 124 and 126. The lower side 146 of the bag, which connects the hollow upstanding side members 142 and 144, lies beneath the pair of skis 72 and poles 100, 114 when positioned on the frame means 12. In this way, saddle bag 140 receives the skis 72 held in the first and second bracket means between the boots 124 and 126 in the bag 140 to effectively lock the bag 140 between the frame means 12 and the skis 72 and poles 110, 114 securing the boots 124, 126 to the frame means 12 with the pair of skis 72. A clip means 148 such as a hook and eye (shown) or mating velcro strips or the like can be provided to connect the upper ends of the hollow, upstanding side members 142, 144 over the poles 110, 114 and pair of skis 72.

Alternatively, securing means in the form of a pair of mating straps 150, 152 (in phantom in FIG. 5) can be passed over the boots 124, 126 and over (or under) the skis 72 from one of the bent wires 24, 26 to the other and the bag means eliminated or a bag having a conventional saddle bag configuration (i.e. connected top supporting separate, descending arms each receiving a separate boot) can be draped over the skis and poles and secured to the frame means 12 by mating straps 150, 152.

Alternatively, individual securing means such as a set of mating straps can be provided for boot 124 extending from portions of bent wire 24 forming either of the vertical sides of the generally rectangular slot 130 while a separate set of straps could be provided from bent wire 26 for the second boot 126. (These sets of straps are not depicted.)

As was previously indicated, the bent wires 24 and 26, forming the major portion of the first frame member 16 are rotatably coupled to the transverse axle member 20 while the bent wire members 40, 42 of the second frame member 18 are spot welded to that member 20. As a result, the second frame member 18 can be rotated (clockwise direction in FIG. 2) with respect to the second frame member 18 around the transverse axle member 20 to collapse the frame means 12 and device 10. The first frame member 16 includes a central opening 154 (FIG. 1) defined by portions of the bent wires 24 and 26 the rectangular members 30 and 60 and right angle bent wires 66 and 68 which provides sufficient clearance for receiving the second frame member 18 in the collapsed configuration of the device 10 and frame means 12 depicted in FIG. 6. Because the center of gravity of the second frame member 18 lies in the middle of the generally "L" side profile of that member, the second frame member 18 naturally swings into the area between the bent wires 24 and 26. In this orientation, transverse axle member 20 constitutes handle means coupled with the first and second frame members 16 and 18, respectively, for carrying the frame means 12 in the collapsed orientation. In addition, the skis 72 can be easily inserted in and removed from the first bracket means 70 when the device 10 is partially collapsed.

Figure 7:
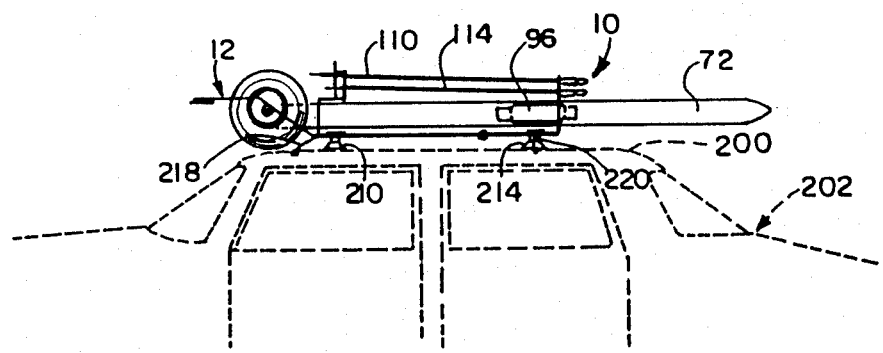
FIG. 7 is a simplified side view of the preferred device vehicle mounted.

As is best seen in FIG. 1 a pair of rubber suction cups 206 and 208 are attached by suitable means such as clamping brackets 210, 212 respectively to a diagonally extending length of the wire 24 under the first frame means 16. A substantially identical rubber suction cup 214 is also attached by suitable means such as a bracket 216 formed by a pair of plates spanning both sides of the wires 40 and 42 at the axial end of second frame member 18. The rubber cups 206, 208 and 214 and their brackets constitute mounting means for mounting the frame means 12 to roof 200 a vehicle 202 in the manner indicated in FIG. 7. The device can be further secured to roof 200 by adjustable straps 218 and 220 looped around wires 24, 26 and 40, respectively, and hooked under the drain channel of the roof 200. If desired, a pair of suction cups can be supported by an out-rigger type of bracket on either side of the second frame member 18 for greater stability.

Figure 8:
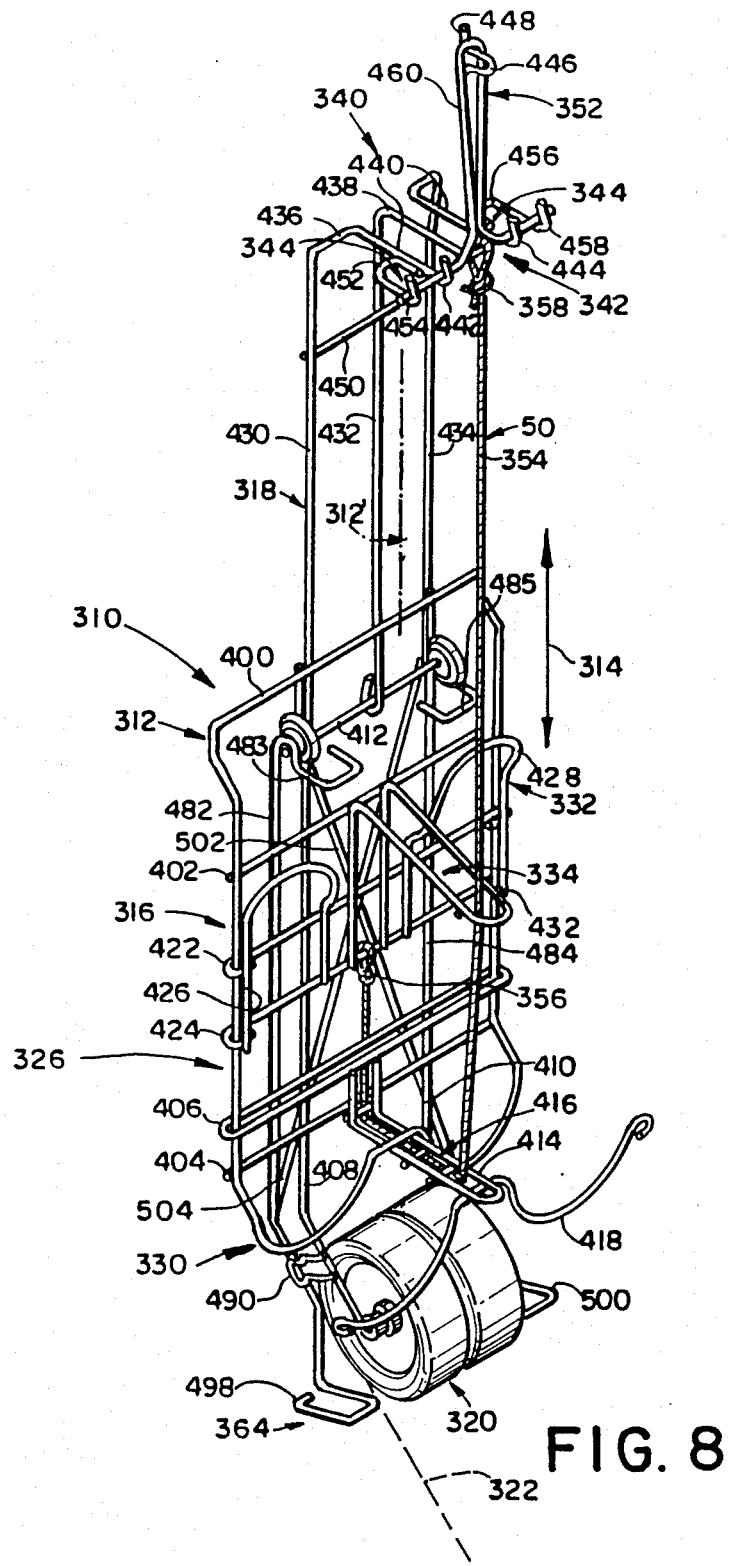
FIG. 8 is a perspective of an alternate embodiment of the device in a fully upright position without ski equipment.
Figure 9:
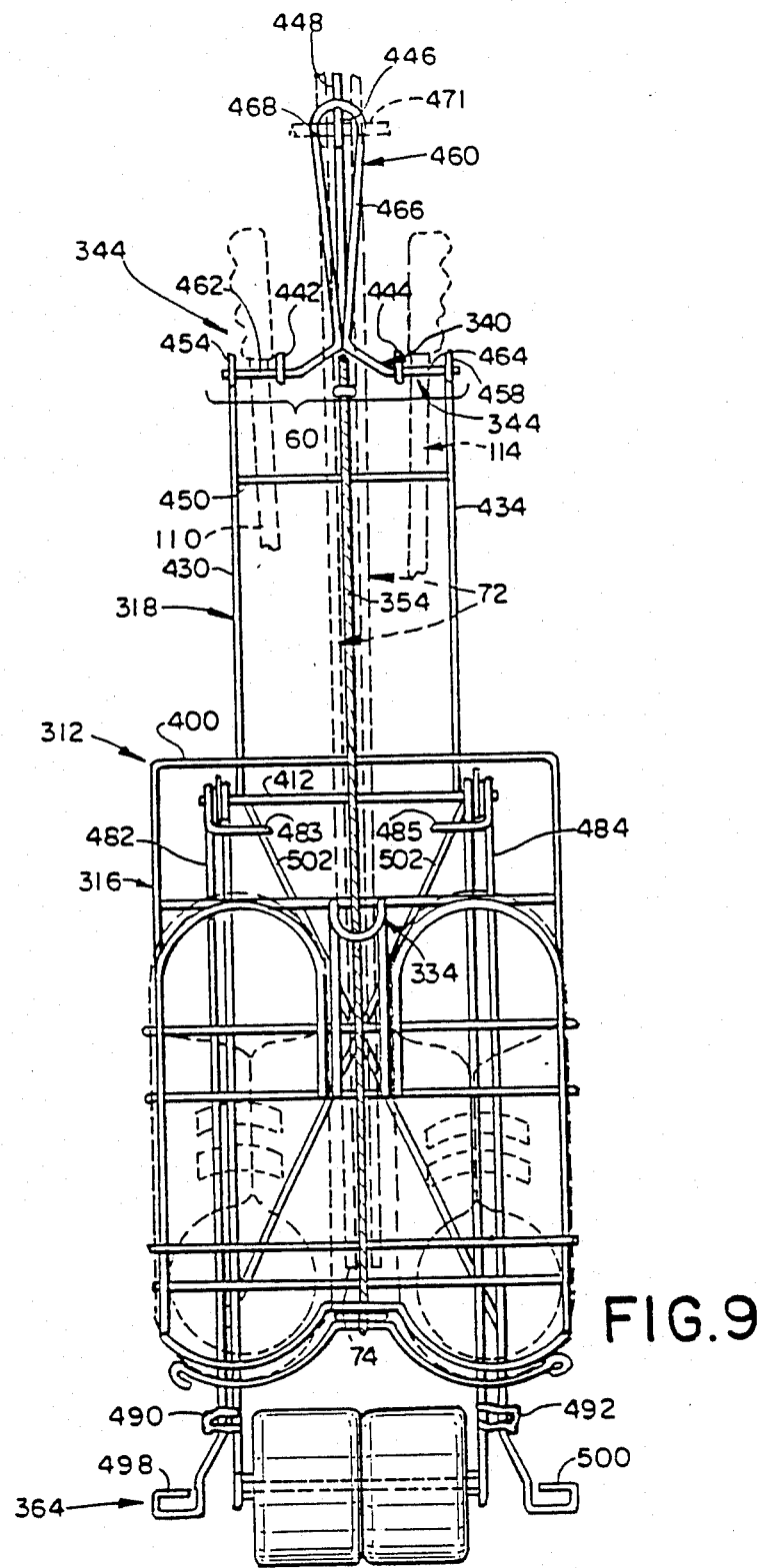
FIG. 9 is a plan view of the device of FIG. 8 indicating in phantom the ski equipment secured to the device.

Referring to FIGS. 8 and 9 an alternate embodiment device for transporting ski equipment is indicated generally at 310 and includes a frame means 312 having an elongated direction indicated by arrowed line 314 in FIG. 8. Frame means 312 includes a first frame member 316 and a second frame member 318. The pair of frame members 316 and 318 are collapsably coupled together at their adjoining ends by means of a transverse axle member 412.

Referring primarily to FIG. 8, first frame member 316 is formed by a multiplicity of individual wires 400, 402, 404, 406, 408, 410 and 412. Ends of the wire 400 are welded together and the wire is bent generally into the form of a rectangle to form a main frame element of the first frame member 316. Wires 402 and 404 are welded to portions of the bent wire 400 extending in the elongated direction 314 to provide further rigidity to the frame. Another wire 406 is looped around the two portions of the wire 400 extending in the elongated direction 314 for further rigidity and to support other elements to be subsequently described. Also spot welded to the cross members 402, 404 and 406 are wires 408 and 410 which all extend in the elongated direction 314. An end of each wire 408 and 410 is bent to encircle wire 412. Wire member 412 rotatably supports other elements subsequently described.

The main portions of wires 408 and 410 extend generally in the elongated direction 314. A remaining axial end of each wire 408 and 410 is bent transversely to the elongated direction 314 to support a wheel means 30 along a center line 312' (See FIG. 9) of the of the frame means 312 in the elongated direction 314 for rolling the device 310 over a surface indicated by broken lines 322. The extreme axial ends of each wire 408 and 410 are bent to encircle an axle 324 (in phantom in FIG. 9) extending perpendicularly to the elongated direction 314. In this way, the wheel means 320 is rotatably mounted to the first frame member 316.

Welded to the bent wires 400 and 406 is yet another wire 414 bent generally in the form of an elongated U. The parallel legs of the U are bent near the open end of the U and attached at their extreme ends by welding to the wires 404 and 406. The remainder of the wire 414 is bent generally perpendicularly to the elongated direction 314 to form a transversely extending bracket 416 from the base of the U formed by the bent wire 414. Another bent wire piece 418 is welded to the upper end of the bracket 416 and is bent to receive a pair of ski boots (see FIG. 9).

Boot attaching means indicated generally at 326 are provided for receiving and securing a pair of ski boots 328 (indicated in phantom in FIG. 9) to the frame means 312. The boot attaching means 326 includes a first boot bracket means 330 comprising a portion of wire 400 and the wire 418 which are adapted by bending and positioning on the one end of member 316 for receiving an end of each one of a pair of ski boots (see FIG. 9). Coupled to the first frame member 316 is a second boot bracket means 332 mounted for sliding movement in the elongated direction 314 on wire 400 and over wires 408 and 410 for securing the pair of ski boots 328 to the frame means 312 with the first bracket means 330 as indicated in FIG. 9. Underlying support of the pair of ski boots 328 is further provided by wires 404 and 406. The second boot bracket means 332 is formed by a pair of crossmembers 422 and 424 bent at their axial ends around portions of the wire 400 extending in the elongated direction 314. Two additional, generally U-shaped bent wire members 426 and 428 are welded across wires 422 and 424 and are shaped for receiving the front end, of each one of the pair of ski boots 338. (See FIG. 9).

A first ski bracket means 334 is provided on the first frame member 316 extending transversely to the elongated direction 314 of the frame 312 and is adapted for receiving an end of each one of a pair of skis. This first ski bracket means 334 is formed by another wire 430 bent into a U-shape and then further bent across the arms of the U and spot welded to wires 422 and 424 forming part of the second boot bracket means 332. As is indicated in FIG. 9, the ends 338 of each one of the pair of skis 336 are received between the arms of the U formed by the wire 430 which form two sides of the bracket 334. The bracket 334 is further formed by portions of the cross wires 422, 424 of the second boot bracket means 332 and another wire 432 welded across the arms of the U formed by wire 430 at the base of the U. Thus, the bracket 334 is closed on all four sides to prevent transverse movement with respect to the elongated direction 314 by either one of a pair of skis received in the bracket 334.

The other end portion of the frame means 312 is provided by a second frame member 318 also formed in major part by three wires 430 and 432 and 444 each having an axial end wrapped around the cross wire member 412 and extending from that member 412 generally parallel to the elongated direction 314.

Figure 10:
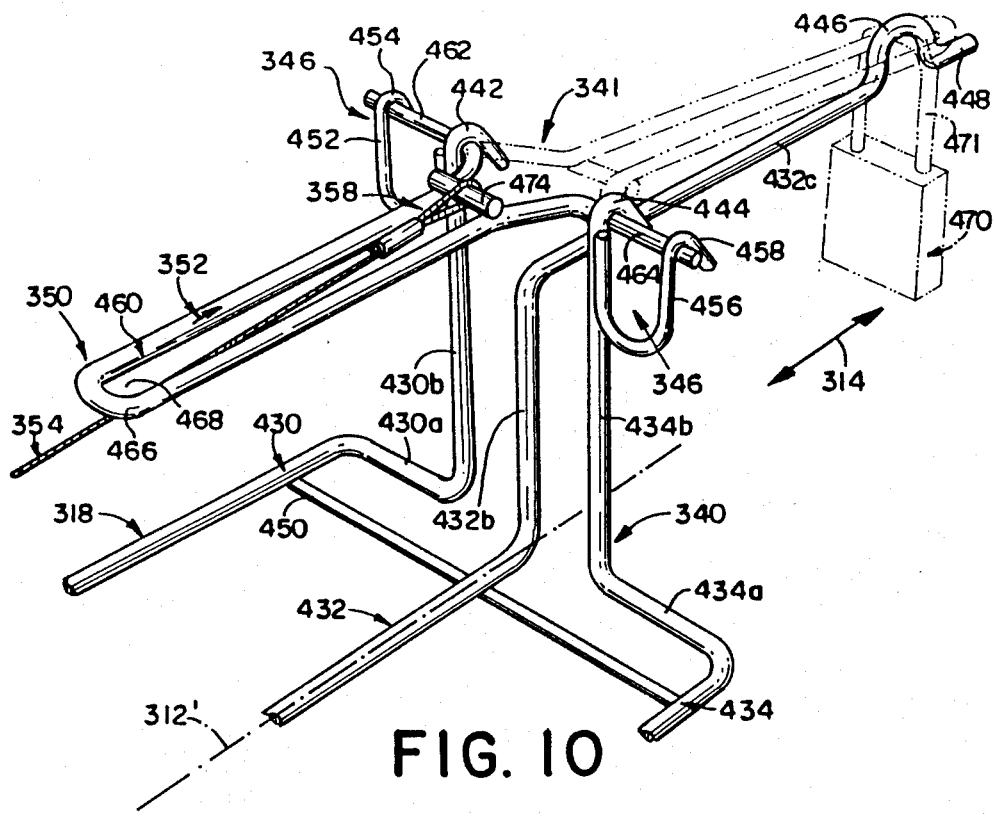
FIG. 10 is an enlarged perspective view of the handle locking mechanism of the device of FIGS. 8-9.

As is best seen in FIG. 10, ends of the outer two wires 430 and 434 distal to cross wire 412 are bent at approximately right angles towards one another forming segments 430a and 434a that extend towards the center wire 432. Before intersecting the center wire 432 portions 430b and 434b of wire 430 and 434 are turned generally perpendicularly to the elongated direction 314 a second time to extend perpendicularly from the plane formed thus far by the wires 430 and 434 and segments 430a and 434a. Wire 432 is bent perpendicularly from that plane and the elongated direction to form segment 432b parallel 430 and 434. At their extreme axial ends, the outer two wires 430 and 434 are again bent through a plane parallel to the elongated direction 314 as to form hooks 442 and 444. The center wire member 432 does not extend transversely to the elongated direction 314 as much as do the outer wires 430 and 434. The center wire 432 is also longer and its remaining axial end 432c is turned again approximately parallel to the elongated direction 314. At its axial end, a 180 degree loop 446 is provided in the wire 432 and an extreme axial end portion 448 of the wire 432 extends beyond the 180 degree loop 446, again approximately parallel to the elongated direction 314. The transversely turned portions 430b and 432b and 434b of the wires 430, 432 and 434 respectively form a second ski bracket means, indicated generally at 340, on the second frame member 318 extending transversely to the elongated direction 314. The second ski bracket means 340 has an open side, indicated generally at 341, for receiving each one of the pair of skis 336 received in the first bracket means 334. (See FIG. 9) Another wire 450 is welded across each of the wires 430, 432 and 434 before each of those wires is bent from the elongated direction 314 to complete the second frame member 318 of the frame means 312, and to close a remaining side of the second ski bracket means 340.

A wire 452 is bent in an approximately U shape and one leg of the U shape spot welded to the transverse portion 430b of wire 430. The remaining axial end of the wire 452 is bent to form a hook 454 symmetric the hook 442 and 444. A second wire 456 is bent symmetrically with respect to wire 452 ad the center line 312' of the frame means 12 and spot welded to the transversely extended portion 430b of the wire 434. A hook 458 is symmetrically provided at a remaining axial end of the wire 456. The wires 452 and 456 form, with the transverse portions 430b and 434b of wires 430 and 434 a third, ski pole bracket means 344 on the second frame member 318 of frame means 312 extending transversely to the elongated direction 314 and having an open side, again generally indicated at 341 for receiving a shaft of each one of a pair of ski poles 346 (see FIG. 9).

Securing means 350 are provided in the form of a locking member 352 and an elongated flexible member 354 having an end 356 coupled with the first frame member 316 at the one end of frame means 312 by being coupled with the second boot bracket means 332. another end 358 is coupled with locking member 352. The elongated flexible member 354 is provided, in part, as a coupling means for coupling the locking member 352 with the first frame member 312 at the one end portion of the frame means 312 to prevent the locking member from being lost. The flexible member 354 enables the securing means 350 to be movable at least in the elongated direction 314 for positioning another end of the securing means 350, provided by locking member 352, over the open side 341 of the second ski bracket means 340, and securing the pair of skis 336 received in both the first and second ski bracket means 334 and 340, respectively to the frame means 312. (See FIG. 9)

The locking member 352 is formed by a single wire 460 bent to approximate the shape of a T. As best seen in FIG. 10, axial end portions 462 and 464 of the wire 460 forming the cross piece of the T and a generally U-shaped central portion 466 of the wire 460 forming the upright member of the T. Hooks 442, 444, 454 and 458 provide pivot means coupled with the second frame member 318 at the other end portion 318 of the frame means 312 for receiving said locking member 352 to close the open end 341 of the second bracket means 340 and for supporting said locking member 352 for rotation in a plane generally parallel with the elongated direction 314 (i.e. normal to the plane of FIG. 9) The axial ends 462 and 464 of the locking member 352 are adapted to be received in the hooks 436, 438, 454 and 458 for closing the open side 341 of the second bracket means 340 and of the third ski pole bracket means 346.

The central portion 466 of the locking member 352 is configured to form a central opening 468 in a generally closed loop, sized and positioned so as to receive the 180 degree loop 446 and to rest upon the axial end 448 of the central wire 432 as is indicated in phantom. The shackle 471 of a padlock 470 (both in phantom) or one end of a flexible wire ski lock can be passed through the loop 446 and over the sides of central portion 466 in the manner indicated in FIG. 10 to lock the locking member 352 to the frame means 312 and across the open end 341 of the second ski bracket means 340 and the third, ski pole bracket means 346, thereby locking a pair of skis 46 simultaneously received in the second ski bracket means 340 and first bracket means 334 and a pair of ski poles received in the third, ski pole bracket means 346 to the frame means 312.

As is best seen in FIG. 10, a piece of wire 474 is welded across the central portion 466 of the locking member 352 substantially parallel to but axially displaced from the axial end pieces 462 and 464. The end 358 of the flexible member 354 of the securing means 350 is attached to the wire 474. Attached in this way, the locking member 352 can be used to tension the flexible member 354 biasing the second boot bracket means 332 towards the first boot bracket means 320 by rotating the locking member 352 in the pivot formed by hooks 442, 444 and 458 to the position depicted in FIGS. 8, 9 and 10 while simultaneously closing the open side 341 of the second ski bracket means 340 and third, ski pole bracket means 344. When the locking member 352 is locked to the frame means 312 in this manner, the securing means 350 maintains the second boot bracket means 330 biased against the first boot bracket means 328 locking a pair of ski boots received by the two boot bracket means to the frame means 312.

Yet another important aspect of the invention depicted in FIGS. 8 and 9 is the wheel means 320a provided by single wheel also indicated by 320 rotatably mounted between the pair of bent wires 408 and 410 forming part of the first frame member 316 at the lower half end portion of the frame means 312. Since the wheel 320 is the only means of supporting the frame means 312 when transporting the device 310 over a surface by hand, the wheel 320 is wider in the axial direction than wheels previously employed on such devices. Desireably, the wheel 320 is more than at least about 8" in diameter and preferably at least about 4" wide in the axial direction so as to better distribute the weight of the device 312 and the carried ski equipment over a greater surface.

Figure 11:
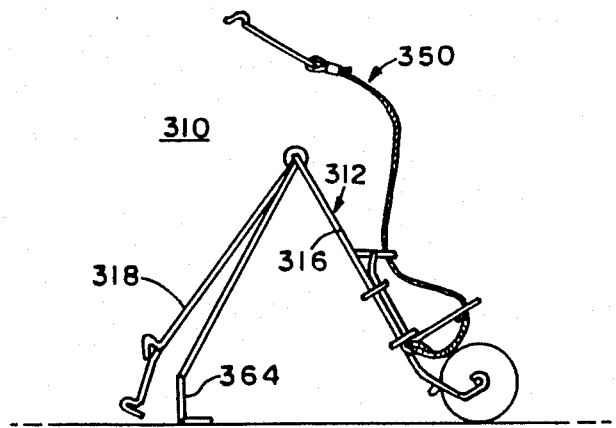
FIG. 11 is a simplified side view of the device showing the handle half end of the frame folded over the deployed stand of the device.

Stand means 364 are provided primarily by two lengths of bent wire 482 and 484 which are symmetric to one another along the center line 312' of the frame means 312. The stand means 364 is pivotally mounted to the frame means 312 by bending each wire 482, 484 near one end around the cross wire 412. This permits rotation of the stand means 364 about that wire 412 from a first, retracted position indicated in FIGS. 8 and 9 and generally aligned with the elongated direction 314 to a second extended position depicted in FIG. 11 generally transverse to the elongated direction 314 for supporting the frame means 312. The extreme axial end of each member 482 and 484 proximal wire 412 is further bent to form a U shaped stop member 483, 485, respectively. These contact wires 408 and 410 of the first frame member 312 when the stand means 364 is rotated into the extended orientation indicated in FIG. 11 and prevent further rotation by the stand means 364. Central portions of each wire 482 and 484 extend substantially parallel to the wires 408 and 410 and the elongated direction 314. In the vicinity of the wheel 320, each of the wires 482 and 484 is bent transversely at an angle to the elongated direction 314 to substantially parallel bends in the wires 408 and 410, which are provided to displace the wheel 320 from the elongated direction 14 and from the general plane of the frame means 312 to permit the frame means 312 to be mounted to a vehicle in the manner shown in FIG. 7. As is best seen in FIG. 9, U shaped wires 90 and 492 are welded to each of the wires 408 and 410 along the transversely extending portions of those members 408, 410 respectively. Each U shape wires 490, 492 are also bent transversely to the plane of the U at about its center to form a hook for capturing transversely extending portions of each of the stand means wires 482 and 484, running parallel with the transversely extending end portions of the wires 408 and 410. The stand means 364 is thus secured against the first frame member 316 forming the lower half portion of the frame means 312 for transporting the device 310 from the vehicle or along the ground. The remaining axial end of each of the wires 482 and 484, is bent transversely apart from one another and from the elongated direction 314 of the frame means 312 to provide a greater base of support for the stand means 354. The extreme axial end of each wire 482 and 484 is bent to form a rectangular member 498 and 500 which are parallel to one another and parallel to a horizontal surface upon which the wheel 320 and the members 498 and 500 rest when the stop members 483 and 485 contact the wires 408 and 410. A pair of diagonal wires 502 and 504 are welded at either end to the wires 482 and 484 to provide rigidity to the stand means 364.

Although not shown for clarity in FIGS. 8–11, rubber cups like cups 206 and 208 can be attached by suitable means such as brackets like bracket 310, 312 of the preferred embodiment to the axially extending wires 408 and 410 of the first frame member 316 at lower one end portion of the frame means 312. Substantially identical rubber cups can also be attached by suitable means such as brackets to portions of wire 430, 432 and 434 extending parallel to the elongated direction 312 of the second frame member 318.

While bent steel wire is used in the described embodiments of the invention, it is envisioned that a skeletal frame means like the frame means 12 and 312 can also be formed primarily if not entirely, at least in part, from molded plastic and the invention is intended to cover a molded plastic configuration as well.

The small size and light weight of the subject invention provides significant advantages in loading, unloading, pulling, carrying and storing ski equipment when compared with prior devices. In addition to being moved along the ground on its wheel means, the skeletal framework of the subject invention readily excepts clips at any of a variety of locations to enable a shoulder strap to be mounted and the invention carried. The fixed stand at the wheeled end of the preferred embodiment enables the device with the equipment to be stood on end for loading or unloading equipment or for storing equipment not in use. In addition, the skeletal framework enables the invention, with or without equipment, to be hung from conventional hooks further increasing the versatility of the invention for storage.

Figure 12:
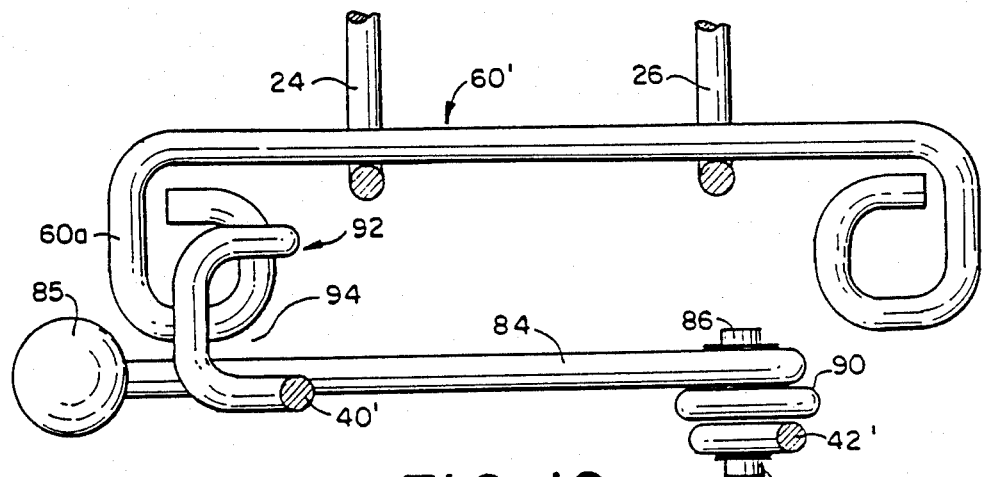
FIG. 12 is a simplified plan view of a preferred boot support member on the first frame member of the device 10 of FIGS. 1-7 for clipping the first and second frame members of the device together in the collapsed configuration.

FIG. 12 depicts a preferred variation on the preferred embodiment of FIGS. 1–7. In place of the closed rectangular member 60, single wire 60' is provided again draped across and spot welded to the wires 24 and 26. Each of the axial ends of the wires are bent into a generally spiral curve to close and to provide lower support for a pair of boots 124 and 126 received in slots 130 and 132 (see FIG. 3). The added advantage of this configuration is that one of the spirals 90a is sized and positioned so as to be insertable into the open side 94 of bracket 92 on the axial end of the second frame member 18 so as to clip and secure that axial "free" end of the second frame member 18 to the first frame member 16 when the frame means 12 is in the collapsed configuration.

In addition to being mountable itself as a roof rack, the device 10 can be mounted on a fixed roof rack of the type having a plurality of vertically extending fingers for receiving and securing skis on their sides (as depicted in FIG. 2) by means of straps. The device 10 is simply laid over such a rack instead of directly on a roof and strapped to the rack by straps extending over the skis 72 in the device 10 and portions of the frame means 12.

A pair of skis 72 and pair of poles 110, 114 are partially depicted in phantom in FIG. 9 to show the retention of the ski ends 74 in the first bracket means 334 and the sides of the skis 72 in the second bracket means 340 and the receipt of shafts of the pair of ski poles 346 in the third bracket means 344.

The wires of the frames are suggestedly steel $\frac{1}{4}''$ to $\frac{3}{8}''$ in diameter.

It will be appreciated by those skilled in the art that other various modifications could be made to the illustrated and described ski equipment transporting device without departing from the spirit and scope of this invention. All such modifications and changes fall within the scope of the appended claims and are intended to be covered thereby.

What we claim is our invention is:

1. A device for transporting ski equipment comprising:
    frame means adapted for collapsed and extended orientations and having an elongated direction in the extended orientation for receiving and supporting a pair of skis and including first and second frame members rotatably collapsably coupled together for providing said collapsed and extended orientations;
    first bracket means on the first frame member extending transversely to the elongated direction and having a central opening for receiving ends of a pair of skis;
    second bracket means on the second frame member extending transversely to the elongated direction and having an open side for receiving the pair of skis received in the first bracket means; and
    latching means positionable across said open side of the second bracket means for closing said open side and securing the pair of skis received in both the first bracket means and the second bracket means to the frame means.

2. The device of claim 1 further comprising a pair of wheels coupled with the frame means for rolling the device across a surface, said pair of wheels being spaced axially apart sufficiently to receive a pair of skis therebetween.

3. The device of claim 1 wherein at least one of the first and second frame members is further adapted for receiving and supporting a pair of ski boots side by side, each ski boot on an opposing side of the pair of skis received in the first and second bracket means.

4. The device of claim 3 further comprising securing means for securing the pair of ski boots to the one frame member.

5. The device of claim 1 wherein said first frame member has a central opening for receiving the second frame member in the collapsed orientation.

6. The device of claim 1 wherein each frame member is formed by plural bent wires.

7. The device of claim 1 wherein at least one of the pair of wheels is at least 4 inches wide in the axial direction.

8. The device of claim 2 further comprising stand means coupled with the frame means proximal the pair of wheels and positioned to support the device and a pair of skis received in the device in a generally upright position with the pair of wheels off the ground.

9. The device of claim 6 further comprising protective caps means positioned at an extreme tip of at least one bent wire forming at least one of the frame members.

10. The device of claim 1 wherein the latch means adapted to receive a lock while closing the open side of the second bracket means for locking a pair of skis received in the first and second bracket means to the frame means.

11. The device of claim 1 wherein portions of the first and second frame members are configured to at least partially overlap one another and clip together in the collapsed orientation for releasably securing together the first and second frame members in the collapsed orientation.

12. The device of claim 1 wherein portions of the first and second frame members are configured to partially overlap one another and clip together in the collapsed orientation to releasably secure the first and second frame members together in the collapsed orientation.

13. The device of claim 5 further adapted for engaging together the first and second frame members with at least a portion of the second bracket means extending through the central opening.

14. The device of claim 10 wherein said first frame member has a central opening for receiving the second frame member in the collapsed orientation and wherein portions of the first and second frame members are configured to at least partially overlap one another and clip together in the collapsed orientation after passing the second frame member through the central opening for releasably securing together the first and second frame members in the collapsed orientation.

15. A device for transporting ski equipment comprising:
frame means adapted for collapsed and extended orientations and having an elongated direction in the extended orientation for receiving and supporting a pair of skis and including first and second frame members collapsably coupled together for providing said collapsed and extended orientations;
first bracket means on the first frame member extending transversely to the elongated direction and adapted for receiving ends of a pair of skis;
second bracket means on the second frame member extending transversely to the elongated direction, the second bracket means having an open side for receiving the pair of skis received in the first bracket means being adapted for receivingand a pair of ski poles with the pair of skis;
third bracket means extending transversely from the frame means and positioned with respect to the second bracket means for receiving and securing to the frame means with the second bracket means a pair of ski poles; and
latching means positionable across said open side of the second bracket means for closing said open side and securing the pair of skis received in both the first bracket means and the second bracket means to the frame means.

16. The device of claim 15 wherein said third bracket means is supported by said first bracket means.

17. The device of claim 15 wherein the third bracket means includes a slot extending generally transversely to the elongated direction of the frame means for receiving a shaft adjoining a basket at one end of a ski pole, portions of the third bracket means on either side of the slot overlapping the basket sufficiently to prevent the pole shaft from being withdrawn from the third bracket means through the slot in the elongated direction of the frame means.

18. The device of claim 17 wherein the latch means is adapted to receive a lock while closing the open side of the second bracket means for locking a pair of skis and a pair of poles received in the first bracket means, second bracket and third bracket means to the frame means.

19. A device for transporting ski equipment comprising:
frame means adapted for collapsed and extended orientations and having an elongated direction in the extended orientation for receiving and supporting a pair of skis and including first and second frame members collapsably coupled together for providing said collapsed and extended orientations;
first bracket means on the first frame member extending transversely to the elongated direction and adapted for receiving ends of a pair of skis;
second bracket means on the second frame member extending transversely to the elongated direction and having an open side for receiving the pair of skis received in the first bracket means, at least one of the first and second frame members further being adapted for receiving and supporting a pair of ski boots side-by-side, each ski boot on an opening side of a pair of skis received in the first and second bracket means;
latching means positionable across said open side of the second bracket means for closing said open side and securing the pair of skis received in both the first bracket means and the second bracket means to the frame means; and
boot bag means for enclosing the pair of ski boots positioned on the first frame member, the boot bag means having an opening extending between the pair of boots received in the boot bag means for receiving the pair of skis held in the first and second bracket means between the boots in the boot bag means, a portion of the boot bag means being positioned between the first frame member and the pair of skis held in the first and second bracket means for securing the pair of boots in the boot bag means to the frame means with the pair of skis.

20. A device for transporting ski equipment comprising:
frame means adapted for collapsed and extended orientations and having an elongated direction in the extended orientation for receiving and supporting a pair of skis and including first and second frame members each formed by plural bent wires and collapsably coupled together for providing said collapsed and extended orientations;
first bracket means on the first frame member extending transversely to the elongated direction and adapted for receiving ends of a pair of skis;
second bracket means on the second frame member extending transversely to the elongated direction and having an open side for receiving the pair of skis received in the first bracket means, at least one of the first and second bracket means being formed by bent wires also forming the frame member supporting the one bracket means; and
latching means positionable across said open side of the second bracket means for closing said open side and securing the pair of skis received in both the first bracket means and the second bracket means to the frame means.

21. A device for transporting ski equipment comprising:
  frame means adapted for collapsed and extended orientations and having an elongated direction in the extended orientation for receiving and supporting a pair skis and including first and second frame members each formed by plural bent wires and collapsably coupled together for providing said collapsed and extended orientations, portions of the bent wires forming the first frame member being configured to receive ends of a pair of boots positioned on the first frame member;
  first bracket means on the first frame member extending transversely to the elongated direction and adapted for receiving ends of a pair of skis;
  second bracket means on the second frame member extending transversely to the elongated direction and having an open side for receiving the pair of skis received in the first bracket means, at least one of the first and second bracket means being formed by bent wires also forming the frame member supporting the one bracket means; and
  latching means positionable across said open side of the second bracket means for closing said open side and securing the pair of skis received in both the first bracket means and the second bracket means to the frame means.

* * * * *